US012783122B2

(12) United States Patent
Richardson et al.

(10) Patent No.: US 12,783,122 B2
(45) Date of Patent: Nov. 3, 2026

(54) REMOVING CORE MEMORY ACCESSES IN HASH TABLE LOOKUPS USING AN ACCELERATOR DEVICE

(71) Applicant: Intel Corporation, Santa Clara, CA (US)

(72) Inventors: Bruce Richardson, Clare (IE); Niall McDonnell, Limerick (IE); Harry Van Haaren, Limerick (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/076,120

(22) Filed: Dec. 6, 2022

(65) Prior Publication Data

US 2023/0102067 A1 Mar. 30, 2023

(51) Int. Cl.
*G06F 3/06* (2006.01)
*G06F 12/08* (2016.01)

(52) U.S. Cl.
CPC ............ *G06F 3/061* (2013.01); *G06F 3/0629* (2013.01); *G06F 3/0673* (2013.01); *G06F 12/08* (2013.01)

(58) Field of Classification Search
None
See application file for complete search history.

(56) References Cited

U.S. PATENT DOCUMENTS

| | | | | |
|---|---|---|---|---|
| 10,795,873 | B1 * | 10/2020 | Matthews | G06F 16/2255 |
| 2019/0102346 | A1 * | 4/2019 | Wang | G06F 16/90335 |
| 2020/0226099 | A1 * | 7/2020 | Vemulapalli | G06F 16/152 |
| 2023/0394082 | A1 * | 12/2023 | Jiang | H04L 45/74591 |
| 2024/0012811 | A1 * | 1/2024 | Dai | G06F 16/2255 |

* cited by examiner

*Primary Examiner* — Kaushikkumar M Patel
(74) *Attorney, Agent, or Firm* — KDW FIRM PLLC

(57) ABSTRACT

An accelerator device may generate and submit descriptors to be processed by the accelerator device. Software executing on a processor may submit descriptors to the accelerator device to be processed in parallel.

16 Claims, 8 Drawing Sheets

REMOVING CORE MEMORY ACCESSES IN HASH TABLE LOOKUPS USING AN ACCELERATOR DEVICE

BACKGROUND

Hash table lookups are frequently executed operations in many different computing contexts. For example, hash table lookups are frequent in datacenter, networking, database, storage, or other cloud computing workloads. However, the operations associated with hash table lookups are very resource intensive, as the hash tables are often large in size and cannot be stored in smaller processor cache memories. As such, cache misses may occur and the processor pipeline may stall when the core is performing lookups. Furthermore, after a lookup, the processor caches may store hash table data that may not be reused in the near future, wasting cache space for useful data. While instructions to flush the cache may reduce the wasted space, doing so adds additional overhead to the processor cores.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
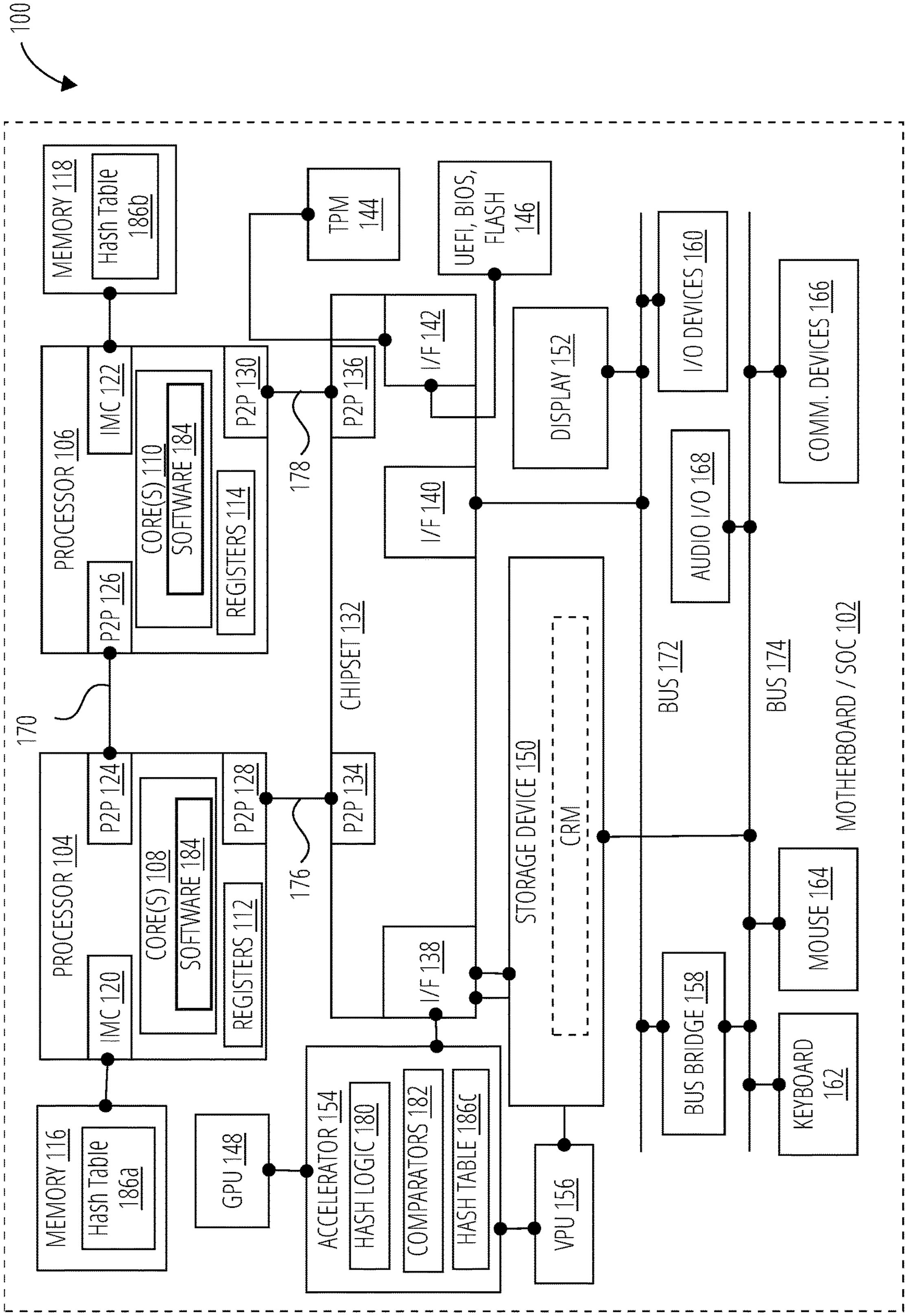
FIG. 1 illustrates an aspect of the subject matter in accordance with one embodiment.

Embodiments disclosed herein leverage an integrated direct memory access (DMA) hardware accelerator to perform hash table lookups without having a processor core access the memory storing the hash table. Generally, embodiments disclosed herein allow the accelerator device to perform hash table lookups to avoid polluting the processor cache (e.g., the L2 cache) with data from the hash table, while prefetching data from the hash table to the processor cache (e.g., an L3 cache) in the event of a hit.

A hash table lookup may include computing a hash value based on an input key to obtain an index into the hash table. The index may be associated one or more buckets, or entries, of the hash table, where each entry may store a respective key and corresponding value (and/or a memory address pointing to the value). The one or more keys may be compared to the input key. If there is a match between the input key and at least one of the keys in the hash table, there may be a hit in the hash table, and the corresponding value is returned. Otherwise, there may be a hash table miss.

Generally, embodiments disclosed herein may group the various operations associated with a hash table lookup into batches of operations (e.g., one or more batch descriptors). Each batch may include one or more operations (e.g., one or more descriptors). For example, a batch descriptor may include one or more descriptors and a fence flag. The fence flag may allow the accelerator device to refrain from processing additional descriptors in the current batch and proceed to processing descriptors in another batch. For example, a first batch descriptor may include a comparison descriptor to cause the accelerator device to compare keys. If the comparison does not result in a match, the accelerator device may detect the fence flag and refrain from processing the remaining descriptor(s) for the first batch. For example, the accelerator device may refrain from processing a copy descriptor in the first batch, as there is no need to return data values from the hash table when the corresponding key did not result in a match. Similarly, if the comparison results in a match, the accelerator device may refrain from processing another descriptor in the batch. Doing so conserves system resources by refraining from performing unnecessary operations.

If, however, the key comparison results in a match, the accelerator device may proceed past the fence flag and process the copy descriptor. Doing so may cause the accelerator device to copy the memory address of a value corresponding to the key in the hash table to another descriptor. The another descriptor may be a descriptor generated by the accelerator device and/or the processor core. The accelerator device may then process the another descriptor, which copies the value at the memory address to a destination memory address to make the value accessible to the processor core (and the software executing thereon). In some embodiments, writing the value may cause the value to be cached to the L3 cache of the processor. Doing so prevents a cache miss and a subsequent read from memory to access the value.

Embodiments disclosed herein may improve the performance of computing systems including integrated accelerator devices by allowing the accelerator device to refrain from performing unnecessary operations in hash table lookups. Furthermore, embodiments disclosed herein may provide a framework to have the accelerator device process hash table lookups without the processor core touching memory that stores the hash table. Further still, conventional accelerator devices are not able to chain multiple operations in hardware, including hash computations, key comparisons, and reading out the data to the requesting entity in the event of a hit in the hash table. Embodiments disclosed herein may allow the accelerator device to program itself to complete hash table lookups, e.g., using one or more additional descriptors.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations “a” and “b” and “c” (and similar designators) are intended to be variables representing any positive integer. Thus, for example, if an implementation sets a value for a=5, then a complete set of components 121 illustrated as components 121-1 through **121-*a* may include components 121-1, 121-2, 121-3, 121-4, and 121-5**. The embodiments are not limited in this context.

Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

FIG. 1 illustrates an embodiment of a system 100. The system 100 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 100 may have a single processor with one core or more than one processor. Note that the term “processor” refers to a processor with a single core or a processor package with multiple processor cores. More generally, the computing system 100 is configured to implement all logic, systems, logic flows, methods, apparatuses, and functionality described herein with reference to FIGS. 1-6.

As used in this application, the terms “system” and “component” and “module” are intended to refer to a computer-related entity, either hardware, a combination of hardware and software, software, or software in execution, examples of which are provided by the exemplary system 100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in FIG. 1, system 100 comprises a motherboard or system-on-chip (SoC) 102 for mounting platform components. Motherboard or system-on-chip (SoC) 102 is a point-to-point (P2P) interconnect platform that includes a first processor 104 and a second processor 106 coupled via a point-to-point interconnect 170 such as an Ultra Path Interconnect (UPI). In other embodiments, the system 100 may be of another bus architecture, such as a multi-drop bus. Furthermore, each of processor 104 and processor 106 may be processor packages with multiple processor cores including core(s) 108 and core(s) 110, respectively. While the system 100 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 104 and chipset 132. Some platforms may include additional components and some platforms may only include sockets to mount the processors and/or the chipset. Furthermore, some platforms may not have sockets (e.g. SoC, or the like). Although depicted as a motherboard or SoC 102, one or more of the components of the motherboard or SoC 102 may also be included in a single die package, a multi-chip module (MCM), a multi-die package, a chiplet, a bridge, and/or an interposer. Therefore, embodiments are not limited to a motherboard or a SoC.

The processor 104 and processor 106 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 104 and/or processor 106. Additionally, the processor 104 need not be identical to processor 106.

Processor 104 includes an integrated memory controller (IMC) 120 and point-to-point (P2P) interface 124 and P2P interface 128. Similarly, the processor 106 includes an IMC 122 as well as P2P interface 126 and P2P interface 130. IMC 120 and IMC 122 couple the processors processor 104 and processor 106, respectively, to respective memories (e.g., memory 116 and memory 118). Memory 116 and memory 118 may be portions of the main memory (e.g., a dynamic random-access memory (DRAM)) for the platform such as double data rate type 4 (DDR4) or type 5 (DDR5) synchronous DRAM (SDRAM). In the present embodiment, the memory 116 and the memory 118 locally attach to the respective processors (i.e., processor 104 and processor 106). In other embodiments, the main memory may couple with the processors via a bus and shared memory hub. Processor 104 includes registers 112 and processor 106 includes registers 114.

System 100 includes chipset 132 coupled to processor 104 and processor 106. Furthermore, chipset 132 can be coupled to storage device 150, for example, via an interface (I/F) 138. The I/F 138 may be, for example, a Peripheral Component Interconnect-enhanced (PCIe) interface, a Compute Express Link® (CXL) interface, or a Universal Chiplet Interconnect Express (UCIe) interface. Storage device 150 can store instructions executable by circuitry of system 100 (e.g., processor 104, processor 106, GPU 148, accelerator 154, vision processing unit 156, or the like). Storage device

150 can store instructions executable by circuitry of system 100 (e.g., processor 104, processor 106, accelerator 154, GPU 148, vision processing unit 156, or the like).

Processor 104 couples to the chipset 132 via P2P interface 128 and P2P 134 while processor 106 couples to the chipset 132 via P2P interface 130 and P2P 136. Direct media interface (DMI) 176 and DMI 178 may couple the P2P interface 128 and the P2P 134 and the P2P interface 130 and P2P 136, respectively. DMI 176 and DMI 178 may be a high-speed interconnect that facilitates, e.g., eight Giga Transfers per second (GT/s) such as DMI 3.0. In other embodiments, the processor 104 and processor 106 may interconnect via a bus.

The chipset 132 may comprise a controller hub such as a platform controller hub (PCH). The chipset 132 may include a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 132 may comprise more than one controller hub such as a chipset with a memory controller hub, a graphics controller hub, and an input/output (I/O) controller hub.

In the depicted example, chipset 132 couples with a trusted platform module (TPM) 144 and UEFI, BIOS, FLASH circuitry 146 via I/F 142. The TPM 144 is a dedicated microcontroller designed to secure hardware by integrating cryptographic keys into devices. The UEFI, BIOS, FLASH circuitry 146 may provide pre-boot code.

Furthermore, chipset 132 includes the I/F 138 to couple chipset 132 with a high-performance graphics engine, such as, graphics processing circuitry or a graphics processing unit (GPU) 148. In other embodiments, the system 100 may include a flexible display interface (FDI) (not shown) between the processor 104 and/or the processor 106 and the chipset 132. The FDI interconnects a graphics processor core in one or more of processor 104 and/or processor 106 with the chipset 132.

Various I/O devices 160 and display 152 couple to the bus 172, along with a bus bridge 158 which couples the bus 172 to a second bus 174 and an I/F 140 that connects the bus 172 with the chipset 132. In one embodiment, the second bus 174 may be a low pin count (LPC) bus. Various devices may couple to the second bus 174 including, for example, a keyboard 162, a mouse 164 and communication devices 166. The communication devices 166 may include a network interface device. Generally, a network interface provides system 100 the ability to communicate with remote devices (e.g., servers or other computing devices) over one or more networks. Examples of a network interface can include an Ethernet adapter, wireless interconnection components, cellular network interconnection components, USB (universal serial bus), or other wired or wireless standards-based or proprietary interfaces.

Furthermore, an audio I/O 168 may couple to second bus 174. Many of the I/O devices 160 and communication devices 166 may reside on the motherboard or system-on-chip (SoC) 102 while the keyboard 162 and the mouse 164 may be add-on peripherals. In other embodiments, some or all the I/O devices 160 and communication devices 166 are add-on peripherals and do not reside on the motherboard or system-on-chip (SoC) 102.

Additionally, accelerator 154 and/or vision processing unit 156 can be coupled to chipset 132 via I/F 138. The accelerator 154 is representative of any type of accelerator device, such as a data streaming accelerator, cryptographic accelerator, cryptographic co-processor, an offload engine, a GPU (e.g., the GPU 148), a vision processing unit (e.g., the vision processing unit 156), or any DMA accelerator device. One example of an accelerator 154 is the Intel® Data Streaming Accelerator (DSA). The accelerator 154 may be a device including circuitry to accelerate data copy operations, data encryption, hash value computation, data comparison operations (including comparison of data in memory 116 and/or memory 118), and/or data compression. The accelerator 154 may be a USB device, PCI device, PCIe device, CXL device, UCIe device, and/or an SPI device. The accelerator 154 can also include circuitry arranged to execute machine learning (ML) related operations (e.g., training, inference, etc.) for ML models.

Generally, the accelerator 154 may be specially designed to perform computationally intensive operations, such as hash value computations, data copying operations, comparison operations, cryptographic operations, and/or compression operations, in a manner that is more efficient than when performed by the processor 104 or processor 106. Because the load of the system 100 may include hash table lookups which include hash value computations, comparison operations, and/or copy operations, the accelerator 154 can greatly increase performance of the system 100 for these operations. Conventionally, however, the accelerator 154 may process some operations that may not be needed. For example, if a key comparison operation does not result in a match, there is no need for the accelerator 154 to continue with the hash table lookup for the corresponding key in the hash table. However, embodiments disclosed herein may break up a hash table lookup into a plurality of batch operations, or batch descriptors, where each batch includes two or more associated operations. For example, a batch descriptor may include a comparison descriptor to compare keys (and/or key addresses), a fence flag, and a copy descriptor to copy the associated value pointer if the comparison descriptor results in a match. If the comparison does not result in a match, the accelerator 154 may detect the fence flag and refrain from processing the copy descriptor, thereby conserving system resources. In some embodiments, the decision to break up the hash table lookup into the plurality of batch operations may be selectively enabled and/or disabled. For example, an OS or hypervisor executing on the motherboard or system-on-chip (SoC) 102 may enable and/or disable any feature described herein. As another example, the software 184 may enable and/or disable any feature described herein.

The accelerator 154 may include one or more dedicated work queues and one or more shared work queues (each not pictured). Generally, a shared work queue is configured to store descriptors submitted by multiple software entities, such as the software 184. The software 184 may be any type of executable code, such as a process, a thread, an application, a virtual machine, a container, a microservice, etc., that share the accelerator 154. For example, the accelerator 154 may be shared according to the Single Root I/O virtualization (SR-IOV) architecture and/or the Scalable I/O virtualization (S-IOV) architecture. Embodiments are not limited in these contexts. In some embodiments, software 184 uses an instruction to atomically submit the descriptor to the accelerator 154 via a non-posted write (e.g., a deferred memory write (DMWr)). One example of an instruction that atomically submits a work descriptor to the shared work queue of the accelerator 154 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 154. A dedicated work queue may accept job submissions from software via commands such as the movdir64b instruction. Descriptors generated by the accelerator 154 may be stored in the dedicated work queues, the shared work queues, and/or any other suitable storage component of the accelerator 154.

As stated, the accelerator 154 may be leveraged to improve the performance of the system 100 when processing hash table lookup operations, e.g., lookups in one or more of the hash tables 186*a*, 186*b*, and/or 186*c*. Generally, a hash table, such as hash tables 186*a*, 186*b*, and/or 186*c*, is a data structure that implements an associative array or dictionary to map keys to values. Stated differently, a hash table may map input data of an arbitrary size to fixed-size values.

Generally, software 184 executing on processors 104, 106 may need to determine whether an input key is stored in the hash tables 186*a*, 186*b*, and/or 186*c*. Examples of software 184 that uses hash table lookups include networking software (e.g., for flow classification, deep packet inspection, etc.), database software (e.g., for accessing key-value-store databases), garbage collection software that uses tree traversal, storage software, artificial intelligence and/or machine learning software (e.g., for locality sensitive hashing, hash-based similarity searches such as image similarity searches, pruning neural networks, and embedding table lookups).

As shown, the accelerator 154 includes circuitry for a hash logic 180 and one or more comparators 182. The hash logic 180 is circuitry configured to compute a value based on an input value (e.g., an input key) and according to a function. The accelerator 154 may use any suitable function may to compute a hash value, such as a cyclic redundancy check (CRC) function. Doing so allows the hash logic 180 to map input data of an arbitrary size to fixed-size values, e.g., map an input key to an index of a bucket in the hash tables 186*a*-186*c*. The comparators 182 include circuitry to compare values and return a result of the comparison (e.g., a match or not a match). The comparators 182 are further configured to compare data at different memory locations based on their respective memory addresses. Therefore, the accelerator 154 is a direct memory access (DMA) accelerator. For example, the comparators 182 may compare data at a first memory address in memory 116 to data at a second memory address in memory 116 based on the first and second memory addresses. In some embodiments, comparators 182 may compare data stored in different locations of memory (not pictured) of the accelerator 154 device, e.g., in the hash table 186*c*. In some embodiments the comparators 182 may compare data stored in the hash table 186*c* and one of the hash tables 186*a*, 186*b*.

Figure 2:
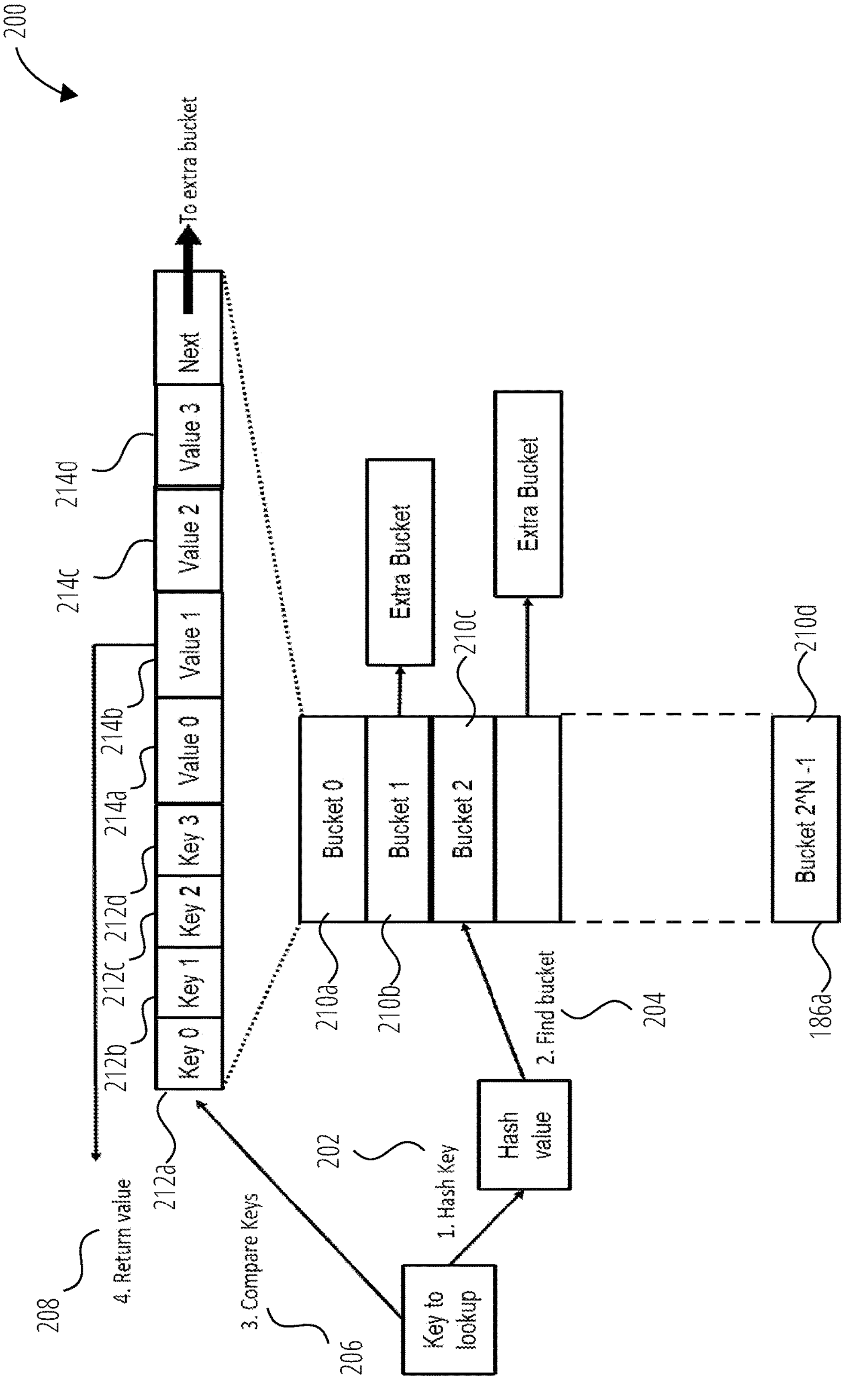
FIG. 2 illustrates an aspect of the subject matter in accordance with one embodiment.

FIG. 2 illustrates an example hash table lookup logic flow 200, according to an embodiment. As shown, FIG. 2 depicts a hash table 186*a*, which is representative of hash tables 186*b* and 186*c*. As shown, the hash table 186*a* includes a plurality of buckets, including buckets 210*a*-210*d*. Each bucket may be associated with a unique bucket address, also referred to as a hash index and/or index value (not pictured) that uniquely identifies each bucket. In some embodiments, the bucket address may be generated by computing a hash value. For example, bucket 210*a* may be identified by the example value of "12345678" and bucket 210*b* may be identified by the example value of "87654321". Any suitable function may be used to compute a hash value, such as a cyclic redundancy check (CRC) function. Generally, each bucket 210*a*-210*d* includes a plurality of entries. For example, bucket 210*a* includes entries 212*a*-212*d*, each of which stores a respective key. In one example, each bucket may include eight entries. However, any number of entries may be used. Each entry 212*a*-212*d* may store a respective key and have an associated value address 214*a*-214*d*. For example, key 212*a* may have an associated value address 214*a* that stores a pointer (e.g., a memory address) which stores a value of the key 212*a*. In some embodiments, however, the value is stored in the hash table 186*a* in lieu of value address 214.

To perform a lookup in the hash table 186*a*, an input key may be hashed at block 202, thereby generating a hash value. The input key may be specified by software 184. At block 204, the computed hash value is used to identify one of the buckets 210*a*-210*d*, e.g., by determining which bucket address matches the computed hash value. Doing so returns one or more keys, such as keys 212*a*-212*d*, from the corresponding bucket 210*a*-210*d*. In some embodiments, the addresses of each key may be returned. At block 206, each key 212*a*-212*d* identified in the bucket at block 204 is compared to the input key. At block 208, one of the comparisons at block 206 results in a match, and the corresponding value address 214*a*-214*d* is returned to software 184. For example, if key 212*b* matches the input key, the value address 214*b* may be returned. If no matches are detected at block 206, a hash table miss occurs.

Figure 3:
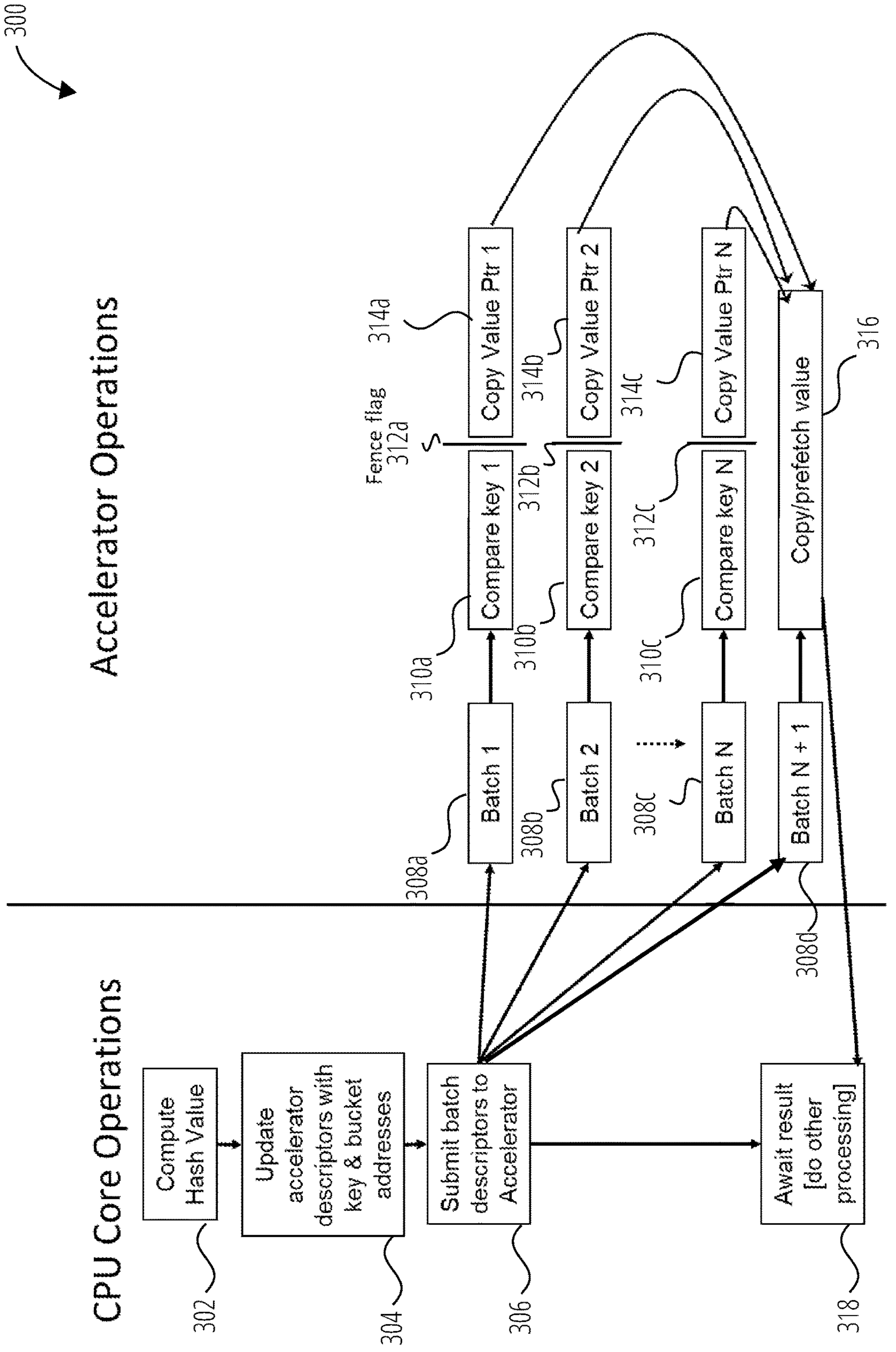
FIG. 3 illustrates an aspect of the subject matter in accordance with one embodiment.

FIG. 3 is a schematic illustrating an example set of operations for a logic flow 300 to remove memory accesses by the core(s) 108, core(s) 110 in hash table lookup operations using the accelerator 154, according to one embodiment. As shown, at block 302, the processor core(s) 108 and/or 110 may compute a hash value based on an input key. The input key may be specified by software 184 executing on one or more of the cores. In some embodiments, however, the accelerator 154 may compute the hash value based on the input key and return the computed hash value (and associated bucket/key information) to the requesting core. The hash value may be the bucket address of one of the buckets 210*a*-210*d* of the hash table 186*a*. For example, the hash value may be the bucket address of bucket 210*a*.

At block 304, the software 184 may cause the processor core(s) 108 and/or 110 to generate (or otherwise modify) one or more batch descriptors to include an address of the input key and the bucket address of each entry in the corresponding bucket (bucket 210*a* continuing with the previous example) in the hash table 186*a*. Therefore, the software 184 may generate a plurality of batch descriptors to be executed in parallel by the accelerator 154. By providing addresses in the descriptors, the core(s) 108, 110 may not need to dereference the pointers to pull the associated values into cache memory. At block 306, the core(s) 108 and/or 110 may submit the batch descriptors to the accelerator 154, e.g., by storing the descriptors in one or more queues of the accelerator 154.

As shown, the batch descriptors submitted at block 306 include batch descriptors 308*a*-308*c*. Therefore, accelerator 154 may process the batch descriptors 308*a*-308*c* in parallel. Generally, at block 304, the core(s) 108 and/or 110 may create a respective batch descriptor for each of N entries in the bucket associated with the bucket address corresponding to the hash value computed at block 302. Continuing with the previous example, if bucket 210*a* includes eight entries, then the core(s) 108 and/or 110 may create eight batch descriptors. As shown, each batch descriptor 308*a*-308*c* includes a respective comparison descriptor 310*a*-310*c*, a respective fence flag 312*a*-312*c*, and a respective comparison descriptor 310*a*.

The comparison descriptors 310*a*-310*c* may specify to compare the input key with the key associated with the respective entry of the bucket. For example, the comparison descriptors 310*a*-310*c* may include a comparison opcode, the address of the input key, and the address of the respective entry of the bucket (which may be determined based on an offset from the bucket address). Continuing with the previous example, comparison descriptor 310*a* may specify to compare the input key to key 212*a* of bucket 210*a*. The accelerator 154 may then process the comparison descriptor, beginning with comparison descriptor 310*a*. For example, the comparators 182 of the accelerator 154 may compare the input key at the specified address to the corresponding entry at the bucket address, which results in a match or not a match.

The fence flags 312*a*-312*c* generally allows the accelerator 154 to implement conditional logic when processing multiple descriptors. For example, when identifying one of the fence flags 312*a*-312*c*, the accelerator 154 may determine whether the associated comparison descriptor resulted in a match (e.g., based on a result opcode in the associated comparison descriptor). For example, if the execution of comparison descriptor 310*a* does not result in a match, there is no need for the accelerator 154 to process copy value pointer descriptor 314*a*, as the value corresponding to the unmatching key in the hash table 186*a* need not be returned. In such an embodiment, the accelerator 154 may proceed to the next batch descriptor. Continuing with the previous example, the accelerator 154 may refrain from processing copy value pointer descriptor 314*a* and instead proceed to processing the next batch descriptor (e.g., batch descriptor 308*b*). If the execution of comparison descriptor 310*b* results in a match, the accelerator 154 may identify fence flag 312*b*. However, because the execution of comparison descriptor 310*b* results in a match, the accelerator executes copy value pointer descriptor 314*b*, which copies the value address of the associated entry in the bucket to another descriptor, namely copy descriptor 316. The copy value pointer descriptors 314*a*-314*c* may generally specify, therefore, an indication of a copy operation, the value address 214*a*-214*c*, and a destination address.

Returning to comparison descriptor 310*a*, if the execution of comparison descriptor 310*a* results in a match, the accelerator 154 may process copy value pointer descriptor 314*a*, which copies the value address of the associated entry in the bucket to another batch descriptor, namely batch descriptor 308*d*, which includes copy descriptor 316. In the embodiment depicted in FIG. 3, the batch descriptor 308*d* and copy descriptor 316 is one of the descriptors submitted by the core(s) 108, 110 at block 306.

The accelerator 154 may then skip (e.g., refrain from processing) batch descriptors 308*b* and 308*c* and execute copy descriptor 316. Copy descriptor 316 may include an indication to copy the data stored at the value address 214*a*-214*c* to a destination address. The destination address may be allocated into a cache memory (e.g., the L3 cache) of the core(s) 108, 110 when written by the accelerator 154. In some embodiments, the core(s) 108, 110 may specify the destination address to the accelerator 154. In some embodiments, the cache memory is an L3 cache. More generally, any memory accessible to the processors 104, processor 106 may include the destination address. Once executed, at block 318, the value associated with the value address 214*a*-214*c* is accessible to software 184 on one or more of core(s) 108, 110 without the software 184 and/or processor core(s) 108, 110 accessing the hash table 186*a*. For example, if a match occurs based on the execution of comparison descriptor 310*a* for the input key and key 212*a* (e.g., based on the accelerator 154 comparing data at the respective memory addresses of the input key and key 212*a*), the accelerator 154 may execute the copy descriptor 316. By executing the copy descriptor 316, the data copied to the destination address may be cached in the L3 cache, which is closer to the core(s) 108, 110 relative to DRAM (e.g., memory 116 and/or memory 118). Doing so "prefetches" the data to the cache to prevent a cache miss and subsequent read of the value address 214*a* by the core(s) 108, 110 from memory 116 and/or memory 118.

If all comparison descriptors 310*a*-310*c* do not result in a match, the copy descriptor 316 may be modified by the accelerator 154 to cover an error, or miss, condition, as there is no hit in the hash table 186*a* for the input key. In such embodiments, the copy descriptor 316 may be modified to include a predetermined error value. When the accelerator 154 identifies the predetermined error value when executing copy descriptor 316, the accelerator 154 may return the error to software 184. In some embodiments, the accelerator 154 may copy the chained cache line associated with a bucket to a last level cache to accelerate a software check on the next bucket (by ensuring the bucket read hits in the last level cache).

The fence flags 312*a*-312*c* may be stored in any suitable data structure. In one example, the fence flags 312*a*-312*c* are stored the respective comparison descriptors 310*a*-310*c*. For example, fence flag 312*b* may be stored in comparison descriptor 310*b*. In another example, the fence flags 312*a*-312*c* are stored in the copy value pointer descriptors 314*a*-314*c*. For example, fence flag 312*c* may be stored in copy value pointer descriptor 314*c*. In other examples, the fence flags 312*a*-312*c* are included in distinct descriptors (e.g., a null descriptor including a fence flag 312*a*-312*c*). Embodiments are not limited in these contexts.

In some embodiments, instead of creating separate batch descriptors, the core(s) 108, 110 may submit a single batch descriptor at block 306. Therefore, in such an example, batch descriptor 308*a* may include comparison descriptor 310*a*, fence flag 312*a*, and copy value pointer descriptor 314*a* followed by comparison descriptor 310*b*, fence flag 312*c*, and copy value pointer descriptor 314*b*, and so on, for each of the N entries in the bucket associated with the bucket address corresponding to the hash value computed at block 302. In such embodiments, the accelerator 154 may jump to the next comparison descriptor if execution of the previous comparison descriptor did not result in a match. For example, if comparison descriptor 310*a* does not result in a match, the accelerator 154 may detect fence flag 312*a* and jump to comparison descriptor 310*b*, and so on.

In some embodiments, a job may submit the copy descriptor 316 for execution to the accelerator 154. Therefore, rather than including the copy descriptor 316 in batch descriptor 308*d*, the job may submit the copy descriptor 316 based on successful execution of the associated comparison descriptor 310*a*-310*c* and associated copy value pointer descriptor 314*a*-314*c*.

Figure 4:
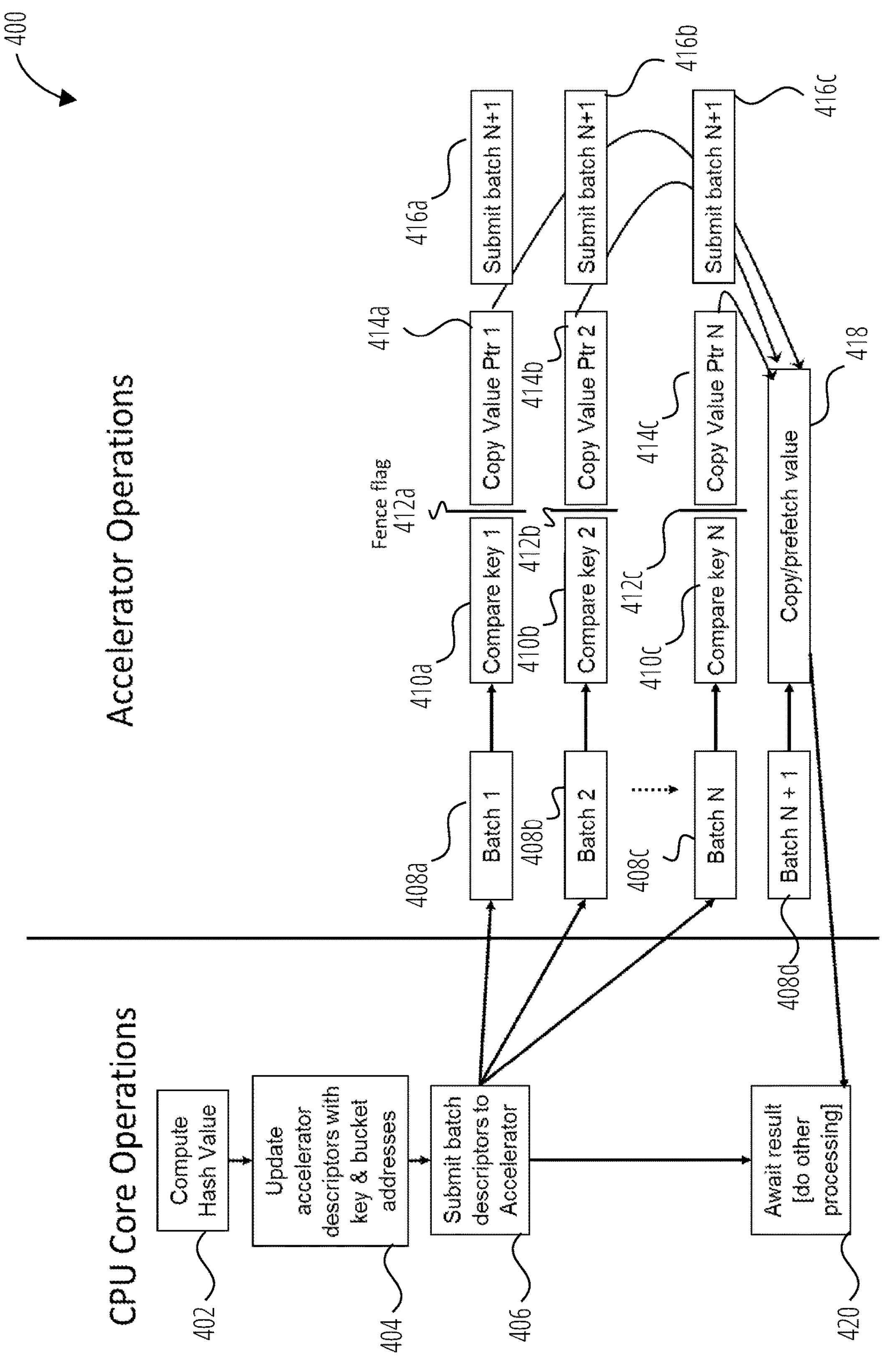
FIG. 4 illustrates an aspect of the subject matter in accordance with one embodiment.

FIG. 4 is a schematic illustrating an example set of operations for a logic flow 400 to remove memory accesses by the core(s) 108, core(s) 110 in hash table lookup operations using the accelerator 154, according to one embodiment. As shown, at block 402, the processor core(s) 108 and/or 110 may compute a hash value based on an input key. The input key may be specified by software 184 executing on one or more of the cores. In some embodiments, however, the accelerator 154 may compute the hash value based on the input key and return the computed hash value to the requesting core. The hash value may be the bucket address of one of the buckets 210*a*-210*d* of the hash table 186*a*. For example, the hash value may be the bucket address of bucket 210*a*.

At block 404, the processor core(s) 108 and/or 110 may generate (or otherwise modify) one or more batch descriptors to include an address of the input key and the bucket address of each entry in the corresponding bucket (bucket 210*a* continuing with the previous example) in the hash table 186*a*. By providing addresses in the descriptors, the core(s) 108, 110 may not need to dereference the pointers to pull the associated values into cache memory. More generally, the software 184 may generate a plurality of batch descriptors to be executed in parallel by the accelerator 154. At block 406, the core(s) 108 and/or 110 may submit the batch descriptors to the accelerator 154, e.g., by storing the descriptors in one or more queues of the accelerator 154. Doing so allows the descriptors generated by the software 184 to be submitted to the accelerator 154 for processing in parallel.

As shown, the batch descriptors submitted at block 402 include batch descriptors 408*a*-408*c*. The accelerator 154 may process the batch descriptors 408*a*-408*c* in parallel. However, in the embodiment depicted in FIG. 4, batch descriptor 408*d* is not submitted by the core(s) 108, 110. Instead, batch descriptor 408*d* is generated by the accelerator 154 based on successfully executing one of the copy value pointer descriptor 414*a*-414*c*. Doing so provides parallelism of different lookup operations across multiple execution engines of the accelerator 154.

As shown, each batch descriptor 408*a*-408*d* includes a comparison descriptor 410*a*-410*c*, a fence flag 412*a*-412*c*, and a submit batch descriptor 416*a*-416*c*. The comparison descriptors 410*a*-410*c* may be the same as comparison descriptors 310*a*-310*c*, e.g., include a comparison opcode, the address of the input key, and the address of the respective entry of the bucket. Similarly, the fence flags 412*a*-412*c* may be the same as fence flags 312*a*-312*c*. Furthermore, as with FIG. 3, the accelerator 154 does not move past fence flags 412*a*-412*c* if the associated comparison descriptors 410*a*-410*c* do not result in a match. For example, if comparison descriptor 410*a* does not result in a match (e.g., based on a result opcode in comparison descriptor 410*a* after the accelerator 154 executes comparison descriptor 410*a*), the accelerator 154 does not process copy value pointer descriptor 414*a* or submit batch descriptor 416*a*. Instead, the accelerator 154 may proceed to batch descriptor 408*b*. If, however, the execution of comparison descriptor 410*a* by the accelerator 154 results in a match, the accelerator 154 may execute copy value pointer descriptor 414*b* and submit batch descriptor 416*a*, e.g., to create batch descriptor 408*d* that includes an indication to copy the value at value address 214*a* to a destination memory address. In some embodiments, the submit batch descriptors 416*a*-416*c* are not used. In such embodiments, the copy value pointer descriptors 414*a*-414*c* may include the instructions to cause the accelerator 154 to generate batch descriptor 408*d*.

Based on the comparison match and submission of the batch descriptor 416*a*, the accelerator 154 may then refrain from processing the remaining batch descriptors (e.g., batch descriptor 408*b*, batch descriptor 408*c*) and proceed to processing batch descriptor 408*d*. Doing so causes the accelerator 154 to execute copy descriptor 418, which may include an indication to copy the data stored at the value address 214*a*-214*c* to a destination address. The destination address may be allocated into a cache memory (e.g., the L3 cache) of the core(s) 108, 110 when written by the accelerator 154. In some embodiments, the cache memory is an L3 cache. More generally, any memory accessible to the processors 104, processor 106 may include the destination address. In some embodiments, the destination memory address is specified by the core(s) 108, 110. Once executed, at block 420, the value associated with the value address 214*a*-214*c* is accessible to software 184 on one or more of core(s) 108, 110 without the software 184 and/or processor core(s) 108, 110 accessing the hash table 186*a*. For example, if a match occurs based on the execution of comparison descriptor 410*a* for the input key and key 212*a*, the accelerator 154 may execute the copy descriptor 418. By executing the copy descriptor 418, the data copied to the destination address may be cached to the L3 cache. Doing so prevents a cache miss and subsequent read of the value address 214*a* by the core(s) 108, 110.

If all comparison descriptors 410*a*-410*c* do not result in a match, the copy descriptor 418 may be modified by the accelerator 154 to cover an error, or miss, condition, as there is no hit in the hash table 186*a* for the input key. In such embodiments, the copy descriptor 418 may be modified to include a predetermined error value. When the accelerator 154 identifies the predetermined error value when executing copy descriptor 418, the accelerator 154 may return the error to software 184. In some embodiments, the accelerator 154 may copy the chained cache line associated with a bucket to a last level cache to accelerate a software check on the next bucket (by ensuring the bucket read hits in the last level cache).

Conventionally, the processors 104, 106 create and/or modify descriptors, not the accelerator 154. Embodiments disclosed herein may allow the accelerator 154 to create and/or modify descriptors. Therefore, embodiments disclosed herein allow the accelerator 154 to program and/or control itself to perform hash table lookup operations.

In some embodiments, instead of creating separate batch descriptors, the core(s) 108, 110 may submit a single batch descriptor at block 406. Therefore, in such an example, batch descriptor 408*a* may include comparison descriptor 410*a*, fence flag 412*a*, copy value pointer descriptor 414*a*, and submit batch descriptor 416*a* followed by comparison descriptor 410*b*, fence flag 412*b*, copy value pointer descriptor 414*b*, and submit batch descriptor 416*b*, and so on, for each of the N entries in the bucket associated with the bucket address corresponding to the hash value computed at block 402. In such embodiments, the accelerator 154 may jump to the next comparison descriptor if execution of the previous comparison descriptor did not result in a match. For example, if comparison descriptor 410*a* does not result in a match, the accelerator 154 may detect fence flag 412*a* and jump to comparison descriptor 410*b*, and so on.

Figure 5:
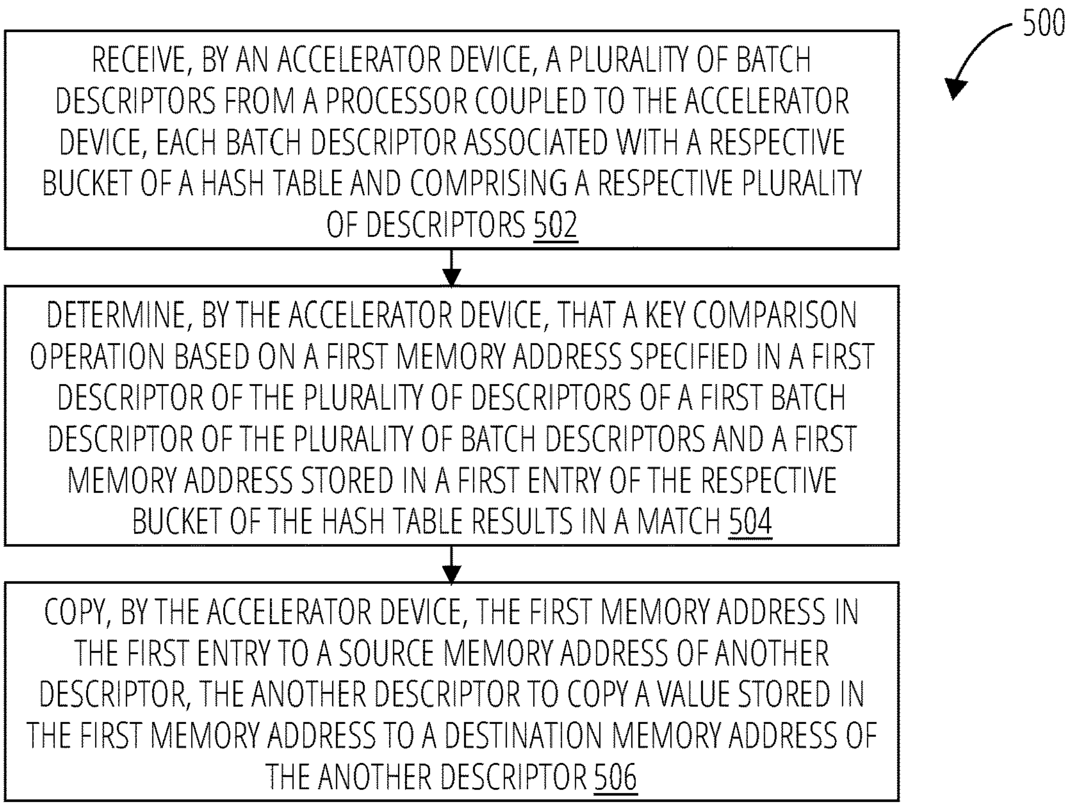
FIG. 5 illustrates a routine 500 in accordance with one embodiment.

FIG. 5 illustrates a logic flow, or routine, 500. Logic flow 500 may be representative of some or all of the operations to remove memory accesses by a processor in hash table lookup operations using an accelerator device. Embodiments are not limited in this context.

In block 502, logic flow 500 receives, by an accelerator device such as the accelerator 154, a plurality of batch descriptors from a processor (e.g., processor 104 or 106) coupled to the accelerator 154, each batch descriptor associated with a respective bucket of a hash table such as hash table 186a and comprising a respective plurality of descriptors. In block 504, logic flow 500 determines, by the accelerator 154, that a key comparison operation based on a first memory address specified in a first descriptor of the plurality of descriptors of a first batch descriptor of the plurality of batch descriptors and a first memory address stored in a first entry of the respective bucket of the hash table results in a match. In block 506, logic flow 500 copies, by the accelerator 154, the first memory address in the first entry to a source memory address of another descriptor, the another descriptor to copy a value stored in the first memory address to a destination memory address of the another descriptor.

Figure 6:
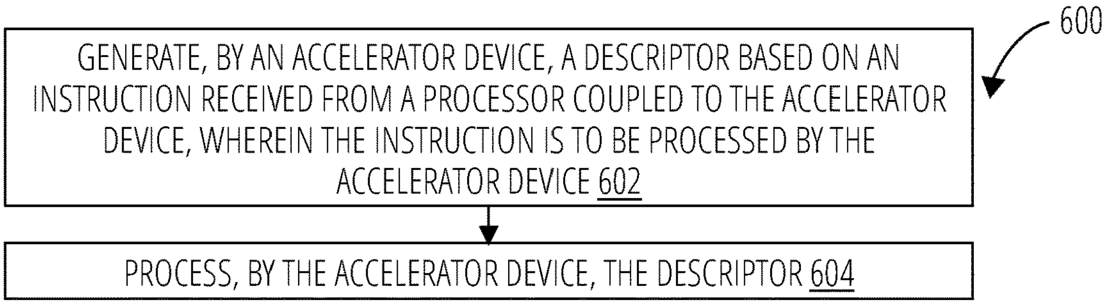
FIG. 6 illustrates a logic flow 600 in accordance with one embodiment.

FIG. 6 illustrates a logic flow 600. Logic flow 600 may be representative of some or all of the operations for an accelerator device to generate descriptors to be processed by the accelerator device. Embodiments are not limited in this context.

In block 602, logic flow 600 generates, by an accelerator device (e.g., the accelerator 154), a descriptor based on an instruction received from a processor coupled to the accelerator device, wherein the instruction is to be processed by the accelerator device. For example, the instruction may be included in one or more descriptors of one or more batch descriptors. In block 604, logic flow 600 processes, by the accelerator device, the descriptor.

Figure 7:
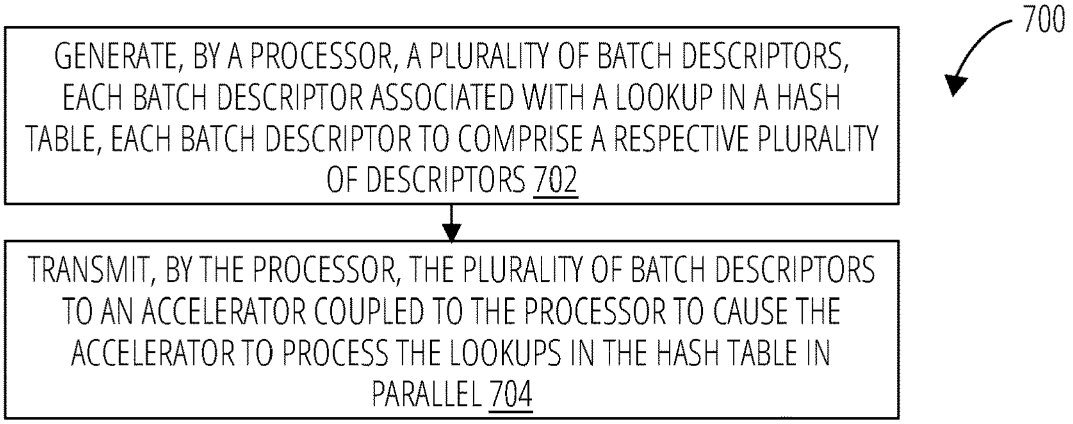
FIG. 7 illustrates a logic flow 700 in accordance with one embodiment.

FIG. 7 illustrates a logic flow 700. Logic flow 700 may be representative of some or all of the operations to remove memory accesses by a processor in hash table lookup operations using an accelerator device. Embodiments are not limited in this context.

In block 702, logic flow 700 generates, by software 184 executing on a processor, a plurality of batch descriptors, each batch descriptor associated with a lookup in a hash table, each batch descriptor to comprise a respective plurality of descriptors. In block 704, logic flow 700 transmits, by the processor, the plurality of batch descriptors to an accelerator (e.g., the accelerator 154) coupled to the processor to cause the accelerator to process the lookups in the hash table in parallel.

Figure 8:
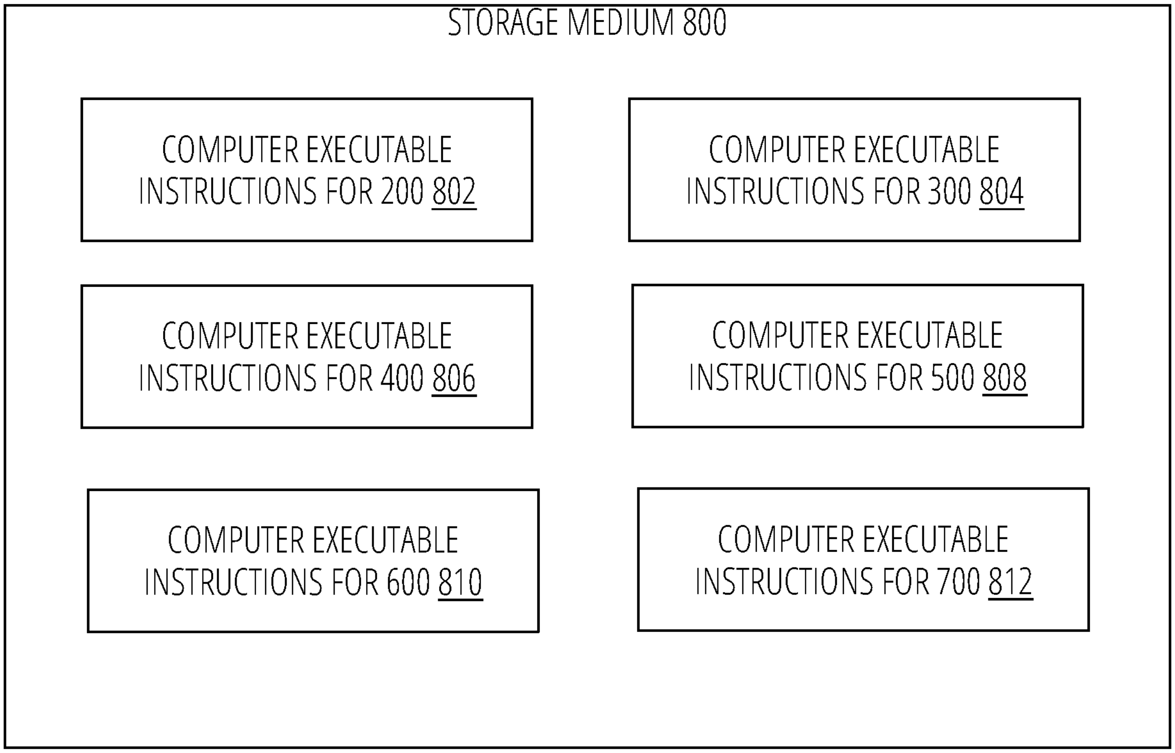
FIG. 8 illustrates an aspect of a storage medium in accordance with one embodiment.

FIG. 8 illustrates an embodiment of a storage medium 800. Storage medium 800 may comprise any non-transitory computer-readable storage medium or machine-readable storage medium, such as an optical, magnetic, or semiconductor storage medium. In various embodiments, storage medium 800 may comprise an article of manufacture. In some embodiments, storage medium 800 may store computer-executable instructions, such as computer-executable instructions to implement one or more of logic flows or operations described herein, such as instructions 802, 804, 806, 808, 810, and 812 for logic flows 200, 300, 400, 500, 600, and 700 of FIGS. 2-7, respectively. The processors 104, 106 may execute any of the instructions in storage medium 800. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms “connected” and/or “coupled” to indicate that two or more elements are in direct physical or electrical contact with each other. The term “coupled,” however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The various elements of the devices as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as “IP cores” may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression “one embodiment” or “an embodiment” along with their derivatives. These terms mean that a particular feature, structure, or characteristic described in connection with the embodiment is included in at least one embodiment. The appearances of the phrase “in one embodiment” in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

The following examples pertain to further embodiments, from which numerous permutations and configurations will be apparent.

Example 1 includes an apparatus, comprising: a processor; and an accelerator device to comprise circuitry to: generate a descriptor based on an instruction received from the processor, wherein the instruction is to be processed by the accelerator device; and process the descriptor.

Example 2 includes the subject matter of example 1, wherein the instruction is to comprise a key comparison operation, wherein the circuitry is to generate the descriptor based on a determination that the key comparison operation results in a match.

Example 3 includes the subject matter of example 2, the circuitry to: detect a fence flag associated with the instruction, wherein the descriptor is generated based on the detection of the fence flag.

Example 4 includes the subject matter of example 2, wherein the key comparison operation is based on a first memory address specified in the instruction and a memory address of an entry of a hash table.

Example 5 includes the subject matter of example 1, the circuitry to generate the descriptor to comprise circuitry to: copy, to a source memory address of the descriptor, a first memory address stored in a first entry of a hash table.

Example 6 includes the subject matter of example 5, the circuitry to process the descriptor to comprise circuitry to: copy a value stored at the first memory address to a destination memory address of the descriptor.

Example 7 includes the subject matter of example 1, the circuitry to: refrain from processing another descriptor associated with the instruction based on the generation of the descriptor.

Example 8 includes a method, comprising: generating, by an accelerator device, a descriptor based on an instruction received from a processor coupled to the accelerator device, wherein the instruction is to be processed by the accelerator device; and processing, by the accelerator device, the descriptor.

Example 9 includes the subject matter of example 8, wherein the instruction is to comprise a key comparison operation, wherein the accelerator device is to generate the descriptor based on a determination that the key comparison operation results in a match.

Example 10 includes the subject matter of example 9, further comprising: detecting, by the accelerator device, a fence flag associated with the instruction, wherein the descriptor is generated based on the detection of the fence flag.

Example 11 includes the subject matter of example 9, wherein the key comparison operation is based on a first memory address specified in the instruction and a memory address of an entry of a hash table.

Example 12 includes the subject matter of example 8, wherein generating the descriptor comprises: copying, by the accelerator device to a source memory address of the descriptor, a first memory address stored in a first entry of a hash table.

Example 13 includes the subject matter of example 12, further comprising: copying, by the accelerator device, a value stored at the first memory address to a destination memory address of the descriptor.

Example 14 includes the subject matter of example 8, further comprising: refraining, by the accelerator device, from processing another descriptor associated with the instruction based on the generation of the descriptor.

Example 15 includes a non-transitory computer-readable storage medium, the computer-readable storage medium including instructions that when executed by circuitry of an accelerator device, cause the accelerator device to: generate a descriptor based on an instruction received from a processor coupled to the accelerator device, wherein the instruction is to be processed by the accelerator device; and process the descriptor.

Example 16 includes the subject matter of example 15, wherein the instruction is to comprise a key comparison operation, wherein the accelerator device is to generate the descriptor based on a determination that the key comparison operation results in a match.

Example 17 includes the subject matter of example 16, wherein the instructions further cause the accelerator device to: detect a fence flag associated with the instruction, wherein the descriptor is generated based on the detection of the fence flag.

Example 18 includes the subject matter of example 16, wherein the key comparison operation is based on a first memory address specified in the instruction and a memory address of an entry of a hash table.

Example 19 includes the subject matter of example 15, wherein the instructions to generate the descriptor comprise instructions to cause the accelerator device to: copy, to a source memory address of the descriptor, a first memory address stored in a first entry of a hash table.

Example 20 includes the subject matter of example 19, wherein the instructions further cause the accelerator device to: copy a value stored at the first memory address to a destination memory address of the descriptor.

Example 21 includes the subject matter of example 15, wherein the instructions further cause the accelerator device to: refrain from processing another descriptor associated with the instruction based on the generation of the descriptor.

Example 22 includes an apparatus, comprising: means for generating, by an accelerator device, a descriptor based on an instruction received from a processor coupled to the accelerator device, wherein the instruction is to be processed by the accelerator device; and means for processing, by the accelerator device, the descriptor.

Example 23 includes the subject matter of example 22, wherein the instruction is to comprise a key comparison operation, wherein the accelerator device is to generate the descriptor based on a determination that the key comparison operation results in a match.

Example 24 includes the subject matter of example 23, further comprising: means for detecting, by the accelerator device, a fence flag associated with the instruction, wherein the descriptor is generated based on the detection of the fence flag.

Example 25 includes the subject matter of example 23, wherein the key comparison operation is based on a first memory address specified in the instruction and a memory address of an entry of a hash table.

Example 26 includes the subject matter of example 22, wherein generating the descriptor comprises: means for copying, by the accelerator device to a source memory address of the descriptor, a first memory address stored in a first entry of a hash table.

Example 27 includes the subject matter of example 26, further comprising: means for copying, by the accelerator device, a value stored at the first memory address to a destination memory address of the descriptor.

Example 28 includes the subject matter of example 22, further comprising: means for refraining, by the accelerator device, from processing another descriptor associated with the instruction based on the generation of the descriptor.

Example 29 includes a non-transitory computer-readable storage medium including instructions that when executed by circuitry of a processor, cause the processor to: generate a plurality of batch descriptors, each batch descriptor associated with a lookup in a hash table, each batch descriptor to comprise a respective plurality of descriptors; and transmit the plurality of batch descriptors to an accelerator coupled to the processor to cause the accelerator to process the lookups in the hash table in parallel.

Example 30 includes the subject matter of example 29, wherein a first batch descriptor of the plurality of batch descriptors is to comprise a comparison descriptor, a fence flag, and a copy descriptor.

31 includes the subject matter of example 30, wherein the fence flag specifies to refrain from processing the copy descriptor based on a determination that processing of the comparison descriptor does not result in a match.

Example 32 includes the subject matter of example 30, wherein the fence flag specifies to process the copy descriptor based on a determination that processing of the comparison descriptor results in a match.

Example 33 includes the subject matter of example 29, including instructions that when executed by the processor, cause the processor to, prior to generating the plurality of batch descriptors: compute a hash value based on an input key; receive, from the accelerator, a plurality of bucket addresses in the hash table based on the hash value; and include, in respective ones of the plurality of batch descriptors, an indication of a respective one of the plurality of bucket addresses and an address of the input key.

Example 34 includes the subject matter of example 33, wherein a count of the plurality of batch descriptors is based on a count of the plurality of bucket addresses.

Example 35 includes the subject matter of example 29, including instructions that when executed by the processor, cause the processor to: receive, from the accelerator based on a hit for an input key in the hash table, a value address associated with a value in the hash table; and access the value based on the value address.

Example 36 includes an apparatus, comprising: an accelerator device; memory to store instructions; and a processor operable to execute the instructions to cause the processor to: generate a plurality of batch descriptors, each batch descriptor associated with a lookup in a hash table, each batch descriptor to comprise a respective plurality of descriptors; and transmit the plurality of batch descriptors to the accelerator device to cause the accelerator device to process the lookups in the hash table in parallel.

Example 37 includes the subject matter of example 36, wherein a first batch descriptor of the plurality of batch descriptors is to comprise a comparison descriptor, a fence flag, and a copy descriptor.

38 includes the subject matter of example 37, wherein the fence flag specifies to refrain from processing the copy descriptor based on a determination that processing of the comparison descriptor does not result in a match.

Example 39 includes the subject matter of example 37, wherein the fence flag specifies to process the copy descriptor based on a determination that processing of the comparison descriptor results in a match.

Example 40 includes the subject matter of example 36, the processor operable to execute the instructions to cause the processor to, prior to generating the plurality of batch descriptors: compute a hash value based on an input key; receive, from the accelerator device, a plurality of bucket addresses in the hash table based on the hash value; and include, in respective ones of the plurality of batch descriptors, an indication of a respective one of the plurality of bucket addresses and an address of the input key.

Example 41 includes the subject matter of example 40, wherein a count of the plurality of batch descriptors is based on a count of the plurality of bucket addresses.

Example 42 includes the subject matter of example 36, the processor operable to execute the instructions to cause the processor to: receive, from the accelerator device based on a hit for an input key in the hash table, a value address associated with a value in the hash table; and access the value in a cache memory of the processor based on the value address.

Example 43 includes a method, comprising: generating, by a processor, a plurality of batch descriptors, each batch descriptor associated with a lookup in a hash table, each batch descriptor to comprise a respective plurality of descriptors; and transmitting, by the processor, the plurality of batch descriptors to an accelerator coupled to the processor to cause the accelerator to process the lookups in the hash table in parallel.

Example 44 includes the subject matter of example 43, wherein a first batch descriptor of the plurality of batch descriptors is to comprise a comparison descriptor, a fence flag, and a copy descriptor.

45 includes the subject matter of example 44, wherein the fence flag specifies to refrain from processing the copy descriptor based on a determination that processing of the comparison descriptor does not result in a match.

Example 46 includes the subject matter of example 44, wherein the fence flag specifies to process the copy descriptor based on a determination that processing of the comparison descriptor results in a match.

Example 47 includes the subject matter of example 43, further comprising prior to generating the plurality of batch descriptors: computing, by the processor, a hash value based on an input key; receiving, by the processor from the accelerator, a plurality of bucket addresses in the hash table based on the hash value; and including, by the processor in respective ones of the plurality of batch descriptors, an indication of a respective one of the plurality of bucket addresses and an address of the input key.

Example 48 includes the subject matter of example 47, wherein a count of the plurality of batch descriptors is based on a count of the plurality of bucket addresses.

Example 49 includes the subject matter of example 43, further comprising: receiving, by the processor from the accelerator based on a hit for an input key in the hash table, a value address associated with a value in the hash table; and accessing, by the processor, the value based in a cache memory of the processor on the value address.

Example 50 includes an apparatus, comprising: means for generating, by a processor, a plurality of batch descriptors, each batch descriptor associated with a lookup in a hash table, each batch descriptor to comprise a respective plurality of descriptors; and means for transmitting, by the processor, the plurality of batch descriptors to an accelerator coupled to the processor to cause the accelerator to process the lookups in the hash table in parallel.

Example 51 includes the subject matter of example 50, wherein a first batch descriptor of the plurality of batch descriptors is to comprise a comparison descriptor, a fence flag, and a copy descriptor.

52 includes the subject matter of example 51, wherein the fence flag specifies to refrain from processing the copy descriptor based on a determination that processing of the comparison descriptor does not result in a match.

Example 53 includes the subject matter of example 51, wherein the fence flag specifies to process the copy descriptor based on a determination that processing of the comparison descriptor results in a match.

Example 54 includes the subject matter of example 50, further comprising prior to generating the plurality of batch descriptors: means for computing, by the processor, a hash value based on an input key; means for receiving, by the processor from the accelerator, a plurality of bucket addresses in the hash table based on the hash value; and means for including, by the processor in respective ones of the plurality of batch descriptors, an indication of a respective one of the plurality of bucket addresses and an address of the input key.

Example 55 includes the subject matter of example 54, wherein a count of the plurality of batch descriptors is based on a count of the plurality of bucket addresses.

Example 56 includes the subject matter of example 50, further comprising: means for receiving, by the processor from the accelerator based on a hit for an input key in the hash table, a value address associated with a value in the hash table; and means for accessing, by the processor, the value based in a cache memory of the processor on the value address.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An apparatus, comprising:

a processor; and an accelerator device to comprise circuitry to:

generate a descriptor based on an instruction received from the processor, wherein the instruction is to be processed by the accelerator device, wherein the instruction is to comprise a key comparison operation, wherein the circuitry is to generate the descriptor based on a determination that the key comparison operation results in a match;

copy, to a source memory address of the descriptor, a first memory address stored in a first entry of a hash table; and process the descriptor.

2. The apparatus of claim 1, the circuitry to:

detect a comparison descriptor, a fence flag, and a copy descriptor associated with the instruction, wherein the descriptor is generated based on the detection of the fence flag.

3. The apparatus of claim 1, wherein the key comparison operation is based on a memory address specified in the instruction and a memory address of an entry of the hash table.

4. The apparatus of claim 1, the circuitry to process the descriptor to comprise circuitry to:

copy a value stored at the first memory address to a destination memory address of the descriptor.

5. The apparatus of claim 1, the circuitry to:

refrain from processing a second descriptor associated with the instruction based on the generation of the descriptor.

6. A non-transitory computer-readable storage medium including instructions that when executed by circuitry of a processor, cause the processor to:

generate a plurality of batch descriptors, each batch descriptor associated with a lookup in a hash table, each batch descriptor to comprise a respective plurality of descriptors, wherein a first batch descriptor of the plurality of batch descriptors is to comprise a comparison descriptor, a fence flag, and a copy descriptor; and transmit the plurality of batch descriptors to an accelerator coupled to the processor to cause the accelerator to process the lookups in the hash table in parallel.

7. The non-transitory computer-readable storage medium of claim 6, wherein the fence flag specifies to refrain from processing the copy descriptor based on a determination that processing of the comparison descriptor does not result in a match.

8. The non-transitory computer-readable storage medium of claim 6, wherein the fence flag specifies to process the copy descriptor based on a determination that processing of the comparison descriptor results in a match.

9. The non-transitory computer-readable storage medium of claim 6, including instructions that when executed by the processor, cause the processor to, prior to generating the plurality of batch descriptors:

compute a hash value based on an input key;

receive, from the accelerator, a plurality of bucket addresses in the hash table based on the hash value; and include, in respective ones of the plurality of batch descriptors, an indication of a respective one of the plurality of bucket addresses and an address of the input key.

10. The non-transitory computer-readable storage medium of claim 9, wherein a count of the plurality of batch descriptors is based on a count of the plurality of bucket addresses.

11. The non-transitory computer-readable storage medium of claim 6, including instructions that when executed by the processor, cause the processor to:

receive, from the accelerator based on a hit for an input key in the hash table, a value address associated with a value in the hash table; and access the value based on the value address.

12. An apparatus, comprising:

an accelerator device;

memory to store instructions; and a processor operable to execute the instructions to cause the processor to:

generate a plurality of batch descriptors, each batch descriptor associated with a lookup in a hash table, each batch descriptor to comprise a respective plurality of descriptors, wherein a first batch descriptor of the plurality of batch descriptors is to comprise a comparison descriptor, a fence flag, and a copy descriptor; and transmit the plurality of batch descriptors to the accelerator device to cause the accelerator device to process the lookups in the hash table in parallel.

13. The apparatus of claim 12, wherein the fence flag specifies to refrain from processing the copy descriptor based on a determination that processing of the comparison descriptor does not result in a match.

14. The apparatus of claim 12, the processor operable to execute the instructions to cause the processor to, prior to generating the plurality of batch descriptors:

compute a hash value based on an input key;

receive, from the accelerator device, a plurality of bucket addresses in the hash table based on the hash value; and include, in respective ones of the plurality of batch descriptors, an indication of a respective one of the plurality of bucket addresses and an address of the input key.

15. The apparatus of claim 14, wherein a count of the plurality of batch descriptors is based on a count of the plurality of bucket addresses.

16. The apparatus of claim 12, the processor operable to execute the instructions to cause the processor to:

receive, from the accelerator device based on a hit for an input key in the hash table, a value address associated with a value in the hash table; and access the value in a cache memory of the processor based on the value address.

* * * * *